March 10, 1970     M. H. ROBERTS     3,499,229

PROCESS CONTROL SYSTEMS

Filed Feb. 26, 1968     3 Sheets-Sheet 1

INVENTOR:
MALDWYN H. ROBERTS
by
Breitenfeld & Levine
ATTORNEYS

March 10, 1970  M. H. ROBERTS  3,499,229
PROCESS CONTROL SYSTEMS
Filed Feb. 26, 1968  3 Sheets-Sheet 3

INVENTOR:
MALDWYN H. ROBERTS
by
Breitenfeld & Levine
ATTORNEYS

United States Patent Office 3,499,229
Patented Mar. 10, 1970

3,499,229
PROCESS CONTROL SYSTEMS
Maldwyn Hugh Roberts, Hazel Grove, Stockport, England, assignor to The Cotton Silk and Man-Made Fibres Research Association, an association of Great Britain, Northern Ireland and the Isle of Man
Filed Feb. 26, 1968, Ser. No. 708,403
Claims priority, application Great Britain, Feb. 25, 1967, 9,092/67; June 7, 1967, 26,253/67
Int. Cl. F26b 3/00
U.S. Cl. 34—23
25 Claims

ABSTRACT OF THE DISCLOSURE

This invention is concerned with intermittent feedback control of processes in which the dead time may vary, and provides for automatic variation of the interval between successive control actions to take into account any variation in dead time in such a manner that variation of control stability is reduced or prevented. The invention is particularly concerned with feedback control of continuous drying of textile material to ensure constant dryness of the processed material. Speed of the material through a heating zone is the control variable and when speed is changed dead time is changed. Stability of control is preserved by varying the interval between corrective actions inversely with processing speed. The invention is also concerned with feedback control techniques and apparatus which involve feeding signals representing respectively the desired and actual values of the controlled variable to a specially programmed device which then gives as output, signals representing the expected corresponding values of the manipulated variable, and correctively changing the value of the manipulated variable either according to any difference in the output signals, or according to the output signal derived from the fed desired value signal, in this case correcting said output signal intermittently according to any difference between the two output signals.

---

Figure 1:
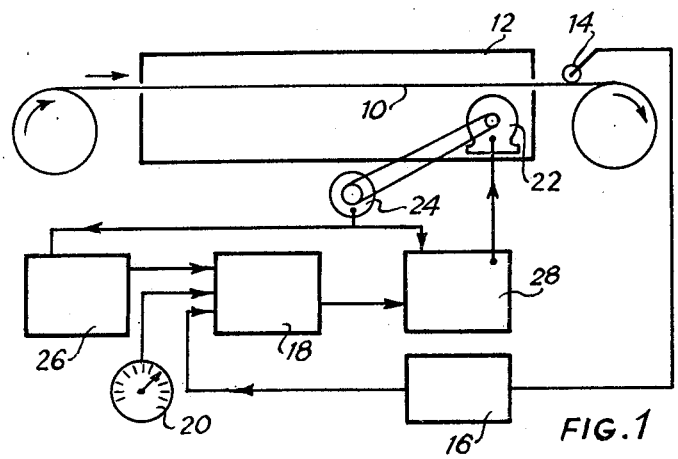

This invention concerns process control systems.

The purpose of a controller in a process control system is to prevent, or at least to correct as quickly and fully as possible, any deviation of the controlled variable from the value it is required to be. The classical feedback controller does this by applying a correction related to the deviation or "error" and this relationship often includes the derivative and integral of error. The main problem in the design of such controllers is to achieve the most rapid response possible without instability (which generally takes the form of damped or continuous oscillation known as "hunting"). Such instability is caused by time lags between cause and effect, and these are of two main types. One arises from energy storage e.g. in flywheels, thermal capacity of heated masses, electrical capacitance and inductance. Use of the derivative of error in the feedback system is effective in reducing and controlling the effect of this type of delay. A much more troublesome type of delay is that due to the time taken for material to travel from a place where it is acted upon by the process to another place where measurement of the result of the processing can be carried out. The special characteristic of this type of delay is that it causes large phase shift, tending to make the system unstable, without the modifying effect of the "high inertia" of the energy-storage type of system. Derivative feedback is less effective and stability with the classical proportional-integral-derivative continuously-correcting controller can be achieved only if the gain (i.e. the amount and rate of correction) is kept low. The result is that the response of such a controller tends to be sluggish or oscillatory.

So-called sampled data systems have been proposed to improve such controllers. According to these proposals corrections are applied at fixed discrete intervals of time. However there are some processes where the application of these proposals would lead to unsatisfactory results. These processes are those in which the dead time varies, for example in the drying of textile material in a stenter, when it is usual to vary the speed of the material through the stenter to control drying. One object of the invention is to improve the control of such processes.

According to one feature of the present invention a method of feedback control of the intermittently operating type for material treatment processes and subject to dead time variation is characterised by automatic variation of the duration of the interval between successive corrective actions of the control in relationship to the dead time whereby to reduce or prevent variation of control stability with variation in dead time. In the case where the processing speed is varied for control purposes then the duration of said interval will vary in inverse relationship to the speed, and in the case where the processing time (but not the speed) is varied for control purposes the relationship will usually be direct. This feature of the present invention is clearly of great value where a manipulated variable is process speed as for example in conventional drying processes for travelling lengths of textile material. In such processes the heating means operates continuously at maximum capacity and the rate of travel of the material is varied with the object of achieving constant longitudinal dryness. The invention also comprises feedback control systems operating according to such methods and machines incorporating such systems.

In general, the simplest embodiments of the invention will use an interval long enough for the full effect of a corrective action to have become apparent at the measuring location before a subsequent corrective action is produced. The use of intervals suitably related to speed or processing time, as the case may be, will have the beneficial effect of keeping constant the stability of control and the speed of response (as expressed in relation to length of material processed rather than in relation to time alone). Existing controllers generally use an interval which is fixed or related only to process error, and are found to have stability and speed of response which varies considerably with dead time.

Figure 2:
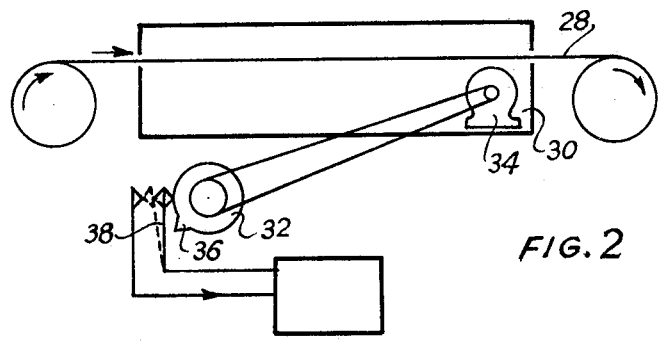
Figure 3:
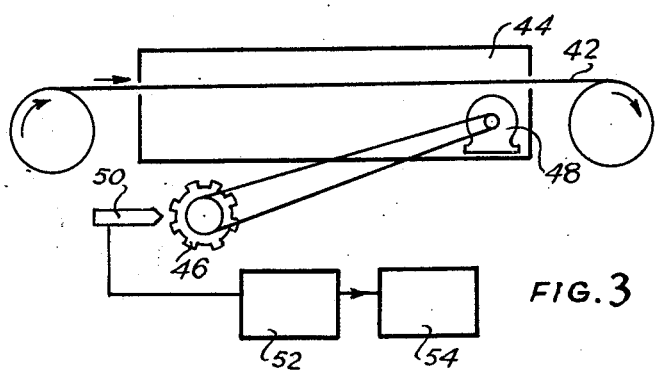
Figure 8:
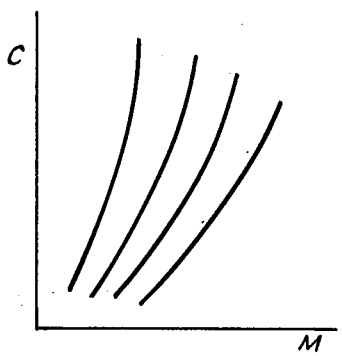
Figure 9:
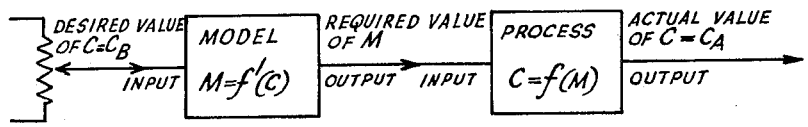
Figure 10:
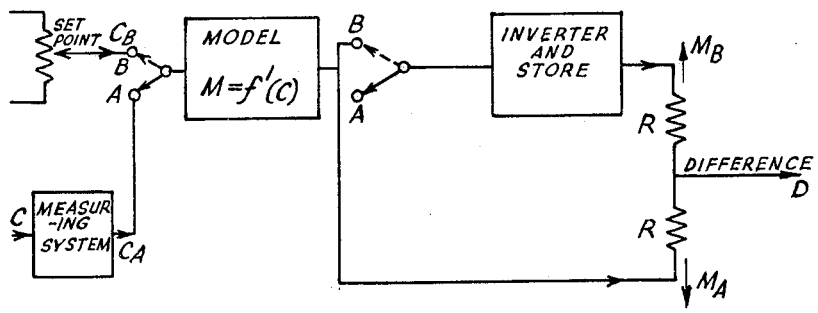
Figure 11:
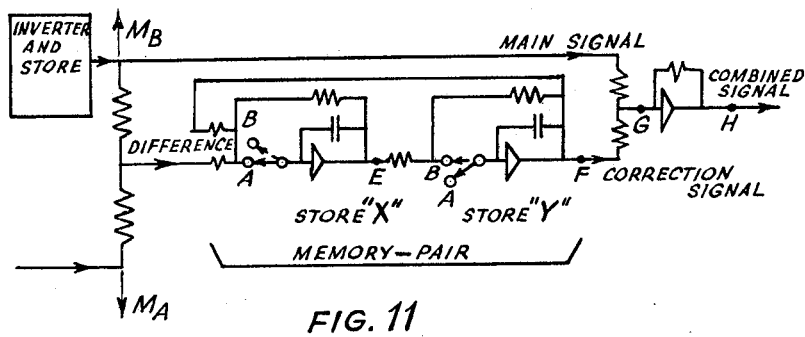

The feature of the present invention just set out will now be described, by way of example only, with reference to certain figures of the accompanying drawings, namely, FIG. 1 which is a diagrammatic representation of one embodiment thereof;

FIG. 2 which is a diagrammatic representation of another embodiment thereof;

FIG. 3 which is a diagrammatic representation of yet another embodiment thereof;

FIGS. 4–8 are graphs showing the manner in which the process control apparatus operate; and FIGS. 9, 10 and 11 are diagrammatic representations of other embodiments of said invention.

In an electronic embodiment a voltage proportional to speed is derived from a tachogenerator (via a rectifier if the tachogenerator is A.C.) and this voltage is fed to an integrating type of circuit, the output of which is arranged to operate a relay circuit to give a pulse, and to reset the system to start afresh, at intervals $\alpha \int (\text{speed})\, dt$ i.e. representing a fixed distance irrespective of speed. FIG. 1 shows such an arrangement. Cloth 10 passes through a drying enclosure 12. The drying process is under the control of a feedback control system. A filtered signal representing the average actual moisture content of the cloth 10 is fed to a process controller 18. The signal is produced by an electrode 14 in contact with the cloth emerging from the drying enclosure 12 which is connected through a moisture measuring circuit 16 to the controller 18. The filtering of the signal is necessary to remove local fluctuations due to uneven moisture content in the dried cloth. At the same time a signal representing the desired moisture content is generated by a setting device 20 and also fed to the process controller 18. A motor 22 which drives the mechanism for progressing the cloth 10 through the drying enclosure 12 also drives a tachogenerator 24 the output of which is connected to an integrator and sampling pulse generator circuit 26 which is adapted to give a pulse at intervals which represent a fixed length of cloth 10 through the enclosure 12, irrespective of cloth speed. The fixed length of cloth chosen must not be less than the length of cloth which must pass through the drying enclosure after a correction has been made to the speed of the cloth for the effect of that correction to be detected by the electrode 14. The electrode 14 is connected to the moisture measuring circuit 16, as aforesaid, which includes a filter having a time constant and the interval between successive corrections must be such as to allow sufficient time to take account of the time constant of the filter circuit as well. Each pulse serves to initiate a corrective action by the controller 18 should one be called for, which action is exercised through a speed controller 28 for the motor 22. The nature and the manner of operation of the process controller 18 is not now described in detail as this will be found later in the specification. In another embodiment, a displacement transducer such as a potentiometer is linked mechanically to a part of the speed-varying mechanism of the processing machine so that with suitable energising of the transducer (e.g. via a resistance network from D.C. supply source) a voltage or current signal may be picked off which varies with speed, and this signal is used to control a pulse generator (e.g. multivibrator) so as to produce a pulse rate substantially proportional to speed.

Referring to FIG. 2 this illustrates a simple mechanical embodiment of the invention as applied to a textile drying machine. As before, cloth 28 passes through a drying enclosure 30 and a rotary member 32 is driven mechanically from a motor 34 which also drives the mechanism (not shown) for progressing the cloth 28 through the enclosure 30 and a cam surface 36 or similar device operates a switch 38 at intervals corresponding to the passage of a certain length of material. Each time the switch 38 is operated a sampling pulse is fed to a process controller 40 of a feed back control system for the purpose of initiating a corrective action if one is necessary. The feedback control system is like that described with reference to FIG. 1. The same result can again be achieved electrically or electronically in a variety of ways. Pulses may be generated by various types of transducer (e.g. magnetic, photoelectric, capacitive) and these pulses counted by any of the available techniques, it being arranged that a timing output pulse is produced when a certain number of pulses, representing the appropriate length of material, have occurred, and the counter reset to repeat the counting process.

FIG. 3 illustrates such an arrangement. Again cloth 42 passes through a drying chamber 44, but in this case a toothed wheel 46 is driven by the motor 48 and the rotation of the teeth past a magnetic transducer 50 causes pulses to be fed to a pulse counter and divider 52 which in turn feeds a timing output pulse to a process controller 54 of a feedback control system of the type previously described.

Generally the method using a tachogenerator and integrator will be preferable, as it can be assembled largely from standard items (there will usually be a tachogenerator already on the machine, for operating a speed indicator, and often it will be possible to use this, thus avoiding additional cost). The same relay which gives the output signal pulse can also reset the integrator for the next cycle, and other contacts can be used to reset for a fresh start whenever there is a machine stoppage. Thus the need for a separate special timing circuit to suppress control action after a stoppage, until one machine length of material has passed, is avoided.

A further object of the present invention is to enable corrections of greater accuracy and rapidity to be achieved in feedback process control systems.

According to a further feature of the present invention a method of feedback control is characterised by the steps of feeding signals representing respectively the desired value of the controlled variable and the actual value of the controlled variable to a device programmed so as to derive from said input signals corresponding output signals representing the values of the manipulated variable which when applied to the process would be expected, at least approximately, in view of the process characteristics, to cause the controlled variable to have the desired and actual value respectively, and correctively changing the existing value of the manipulated variable according to any difference between said output signals. In a modified embodiment, the manipulated variable is correctively changed according to the output signal derived from the desired value input signal, and said output signal intermittently corrected in accordance with any difference between the two output signals. The invention also comprises process control apparatus operating according to such methods and machines incorporating such apparatus.

Such process control apparatus may advantageously be incorporated in feedback control systems as previously described.

The manner in which such process control apparatus operates and suitable modes of construction will now be described with reference to the remaining FIGS. 4 to 11 of the accompanying drawings.

Figure 4:
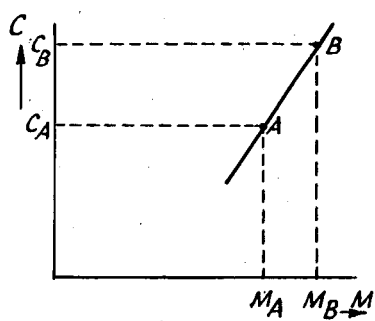
Figure 5:
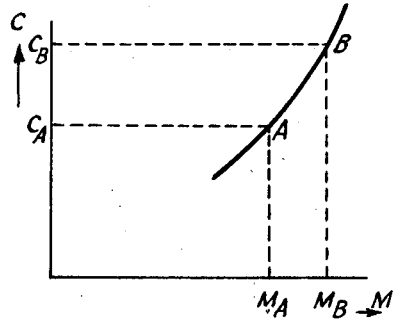
Figure 6:
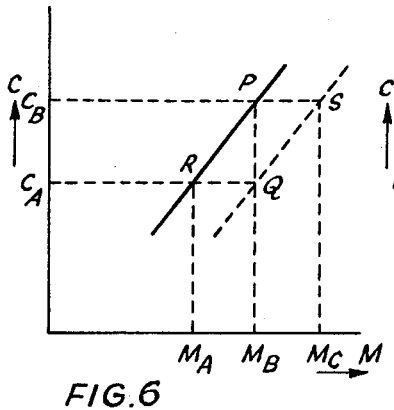
Figure 7:
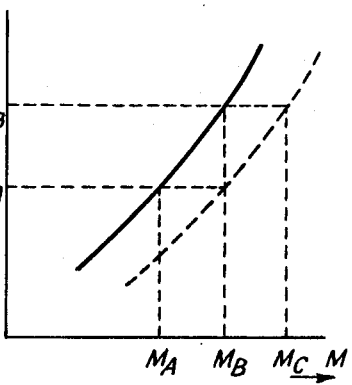

Let the variable to be controlled be C.
Let the variable to be manipulated be M.
C is dependent on M and hence, by increasing or decreasing M, the value of C may be brought to the desired value. A graph of C against M is shown in FIG. 4.

The rate of change of C with change of M, i.e. $dC/dM$ must be neither zero nor infinite. If it were zero, varying M would not vary C, so it would be impossible to adjust the value of C to the desired level. If it were infinite, the value of C would be indeterminate.

Thus it is the finite slope of the graph which makes it possible for us to control C by manipulating M. If we find that C has the value $C_A$, whereas we wish it to be $C_B$, then the graph shows that M must be changed from $M_A$, to $M_B$. This also applies if C is a nonlinear function of M as in FIG. 5. In this case the change in M required to produce a given change in C is no longer constant but varies according to where the points A and B are on this curve of varying slope.

In a control system in which sampled-data techniques are used to give good control of a process largely dominated by "dead time" (i.e. the time taken for the material being processed to travel from the point or points where processing occurs to the point at which the result of processing can be measured and used for control purposes), the best control response is obtained when the amount of change produced in the manipulated variable M by the control action is just right to bring the controlled variable C from its existing value of $C_A$ to the desired value $C_B$. The change in M which is needed in order to do this can be read off from the nonlinear graph of FIG. 5, and is the change from $M_A$ to $M_B$.

Where the relationship between M and C is linear it is sufficient to measure the difference between the existing value $C_A$ and the desired value $C_B$ and then arrange for the controller to produce a change in M proportional to $(C_B - C_A)$. This is the common practice in existing controllers. It will, however, give inaccurate estimates of the required change in M when the relationship between M and C is nonlinear.

According to the feature of the present invention being described there is provided a controller in which a nonlinear relationship may be used to derive corrections in M which result in more accurate and rapid control of C than would result from a linear controller.

As just mentioned above, it is common practice in controllers to derive the difference, $C_B-C_A$, between desired value and existing value, commonly called the "error," and then to derive from this error signal a correction signal to be applied to M. This feature of the present invention differs in this respect, as the controller does not derive the difference $C_B-C_A$ but instead $C_B$ and $C_A$ are each separately applied to a device which represents the nonlinear relationship between C and M, so that values $M_B$ and $M_A$ corresponding respectively to $C_B$ and $C_A$ are derived. The difference between $M_B$ and $M_A$ is then the required change in M, and the signal representing it is applied so as to produce the required change in M.

The device representing the relationship between C and M embodies information already known, at least approximately, about the process. Even though such knowledge may be imperfect, it provides a starting point whereby the value of M may be set initially to give a corresponding value of C which ideally would be the desired value but in practice will be a first approximation to it. One advantage which accrues is that when the process is started up after a stoppage, the value of M is automatically set to approximately the right level, whereas when M is set manually after a stoppage its value may be greatly different from the correct value and existing types of controller generally are slow-acting and take a long time to correct the value of M when working from error feedback signals only.

This advantage accruing from the incorporation in the controller of a device representing the relationship between C and M is still present to a large extent even if such device is very simple and represents only a linear first approximation to the true relationship between C and M.

If the relationship between C and M were both (a) exactly known and (b) not subject to variation, the process would be very easy to control by simply setting M to the value corresponding to the desired value of C. In practical processes, however, even if the relationship is accurately known from theory or experiment, it will be subject to variation caused by other variables (e.g. temperature, pressure, state of material being processed etc.). Ideally all such variables might be measured and their effect on the process output C calculated and adjustments made on this basis, but in practice this will not usually be possible and it will therefore be necessary to employ also control action based on measurement of the deviation of C from the desired value, i.e. feedback or "error-actuated" control and to obtain performance which combines the best features of both types of control. The advantage of so doing is that the use of the "model" (the device representing the relationship between C and M) enables the information from the "set-point" control (by which the desired value of C is set) to be converted immediately into an approximately appropriate value of M without waiting for error to be measured intermittently and the feedback action progressively reduces errors re-resulting from inaccurate knowledge of, or variation in, the relationship between C and M.

If this relationship is appreciably nonlinear, there will be an advantage in making the "model" nonlinear to represent it accurately, in that both the initial value of M and subsequent corrections will be more accurately computed by the controller.

Let us now consider variation in the C vs. M graph. Let the continuous line in FIG. 6 be the assumed relationship, embodied in the model, while the dotted line, parallel to it, is the true relationship (at a particular time). $M_B$ is derived from $C_B$ via P on the solid line, while $C_A$ is the value of C resulting from running the process at $M_B$, and is derived from $M_B$ via Q on the dotted line. The required point is seen to be point S on the dotted line, and from the geometry of the parallelogram PSQR it can be seen that $PS=RQ$, so that the required correction in M is RQ. RQ can be derived as the difference between the value of M produced by feeding $C_B$ into the model and the value of M produced by feeding $C_A$ into the model. This reasoning applies also to FIG. 7 in which the C vs. M relationship is nonlinear but the dotted curve is derived from the solid curve simply by sliding it horizontally, i.e. adding a fixed value of M to every point on it.

The essential feature of this controller is that the difference between $C_B$ and $C_A$ is not used directly, as in normal feedback controllers, but instead each of $C_B$ and $C_A$ separately is applied to the model and the corresponding value of M derived, however nonlinear the model may be, and the difference between these two values of M is the required correction.

The foregoing discussion assumes that variations in the C vs. M graph consist solely of adding the same amount to each value of M, i.e. moving the curve bodily in a direction parallel to the M axis, giving a family of curves which are all parallel at any given value of C. In a process where a family of curves of C vs. M is obtained by multiplying each value of M on a curve by the same factor, a pattern as shown in FIG. 8 is obtained. This may be converted to the pattern of FIG. 7 by taking the logarithm of M as the manipulated variable. Another way of expressing the same thing is to say that a fixed amount of change in log M must always produce the same percentage change in M irrespective of the value of M.

In this way, the advantages of the present invention can be obtained on a process represented by FIG. 8. For example, if M is the speed at which material travels through the process, an electrical signal representing log M can be derived by known methods and can be made the controlled variable in a local control loop around the speed-varying mechanism of the process machine. The input to such loop, i.e. its set-point, will be the output of the controller that is the subject of this application.

Nonlinearity in the relationship between the actual variable C which we wish to control (e.g. the moisture content of a material) and the measurement signal representing it (e.g., an electrical voltage or current) may be of considerable magnitude, but provided that what we have called C in the foregoing graphs is actually the output signal of the measuring system, such nonlinearity has been taken into account and is represented in the graph, combined with any nonlinearity in the process. Thus the model represents a relationship which includes nonlinearity in both process and measuring system, and the computation by the controller of the best initial setting of M and subsequent corrections is not vitiated by nonlinearity of measurement. Nevertheless, extreme nonlinearity in measurement is to be avoided as it is likely to make an accurate and workable model very difficult or impracticable to realise. It is preferable to obtain measurement as linear as can economically be achieved.

The device used as a model to represent the relationship between C and M may be any convenient device in which suitable input and output signals can exist, such as networks of resistors and/or diodes and/or amplifiers, of types commonly used in analogue computing equipment. It is important to note that while M is the input to the process and C the output, the model is required to have the same relationship between M and C as the process but with C as its input and M as its output, as shown in a very simplified form in FIG. 9.

In all the foregoing discussion, it is the steady state relationship of process input and output which is represented in the model.

Since the feedback part of the control action depends on feeding $C_B$ and $C_A$ separately into the model, it is necessary either to duplicate the model or to use it alternately for $C_B$ and $C_A$. Duplication adds to the cost and also raises the danger that the characteristics might not be, or might not remain, sufficiently accurately matched. It is therefore cheaper and more accurate to use a single model with changeover switching, and to enable comparison to be made between the two outputs by storing one while the switches are changed over to the other input. A suitable arrangement is shown in FIG. 10.

The store may conveniently be an inverting and integrating amplifier of the type commonly used in analogue computing equipment. Its output is an inverted replica of its input, and is reset when the switches are in position B. In position A the measured value is connected and the difference, $M_B - M_A$, appears at point D in the above circuit.

When the switches are in position B, there is some advantage in leaving the "straight through" path connected as it enables the zero at point D to be checked.

In FIG. 10 when the synchronized changeover switches move to position A, a signal representing the required correction to M appears at point D, the output of the differencing circuit in which $M_B$ and $M_A$ are compared. Since the store also acts as an inverter, a simple pair of equal resistors can be used as the differencing circuit.

The question then arises as to how this signal representing the required correction to M is to be used. In a simple form of the controller, this signal may be passed directly to a system which causes M to change by an amount proportional to the signal. For example, the signal may be used to charge up a capacitor which is then linearly discharged so as to generate a pulse of duration proportional to the signal, such pulse being applied to the mechanism for changing M, e.g. a speed varying mechanism where M is speed or a function of speed. Other ways of using well-known techniques to produce a change in M proportional to the signal will probably occur to a person skilled in the art. While such arrangements make use of the model as described earlier to derive the best estimate of the required correction to M, the action is purely error-operated and does not make effective use of the information embodied in the model in order to make M respond immediately and appropriately to the initial set-point and later changes in set-point.

A further addition to the system, now to be described enables the output of the store in FIG. 10 to be used as the main signal to make M respond immediately and appropriately to the set-point signal and enables the signal from point D in FIG. 10 to be combined and consolidated as a correction to the main signal, having the same effect as if the solid curves in FIGS. 3 and 4 were shifted parallel to the M axis to a new position as indicated by the dotted curve. FIG. 11 shows the proposed system as a continuation of FIG. 10.

In FIG. 11 the signal from point D is applied to the input of an analogue-computer type of circuit known as a "memory-pair." Assuming that initially the "memory-pair" has been cleared or empty, i.e. the voltage signal stored in it is zero, when the synchronized changeover switches are in position A, store X of the memory-pair is reset so that signal D appears inverted at E, while store Y simply holds its previous value at F which initially is zero. When the switches revert to position B, store Y is reset, again inverting the signal so that a replica of the original signal D appears at F. This signal at point F is fed back to the input of store X so that it will be maintained and recirculated indefinitely even though the signal at D falls to zero. The output of the memory-pair at F is added to the main signal in a simple resistive circuit to give a combined corrected signal at G which optionally is passed on through a buffer amplifier to provide an output signal at H of suitable magnitude and impedance for feeding to the mechanism which sets the value of M in the process.

Thus the action of the memory-pair is to store the correction signal from point D in a permanent form so that it can be added to the main signal and will not disappear again when the signal at D vanishes.

In this way the final output signal combines information derived from the setpoint through the model with information from the measurement of C, also through the model, so that error in the model is effectively corrected. The purpose of the main signal is that any alteration of the set-point is fed straight through (while the switches are in position B, as they are for most of the time) via model inverter and store and thus effect an immediate change in the "Combined Signal" which sets the speed of variable-speed drive (what we call the "manipulated variable"): thus a speed change is made immediately without waiting for errors in controlled variable to appear. The essential feedback control system will still work if the Main Signal is open-circuited, but the required speed change will not be made until the sampling pulse occurs and a Difference Signal arises at D. Thus the purpose of the Main Signal is to give a slightly quicker response to a manual alteration of the set-point, but this is only an optional refinement. Manual alterations to the set-point are comparatively infrequent in practice, occurring only when changing from one type of cloth to another.

Thus the signal stored at terminal F of FIG. 11 is the algebraic sum of difference signals which have arisen at terminal D as a result of differences between the desired and measured values of the controlled variable C. The signal at F is combined with the main signal (which comes from the set-point signal via the model, inverter and store) to form the signal which sets the value of M (e.g. the speed or log-of-speed in a separate closed loop speed control system as explained in column 6, lines 39–45). Hence a change in the signal at F produces a change in M so as to bring C to the set-point value.

It is to be understood that the process control apparatus of FIGS. 10 and 11 can be incorporated in the feedback control systems of FIGS. 1 to 3. Thus, for example electrode 14 (FIG. 1) would feed its signal to the measuring system of FIG. 10 whilst the speed controller 28 would be fed the Difference Signal D (FIG. 10) or the combined signal at H (FIG. 11).

What I claim is:

1. A method of feedback control for processes subject to substantial dead time characterised by the steps of feeding signals representing respectively the desired value of a controlled variable and the actual value of the controlled variable to a device programmed so as to derive from said input signals, corresponding output signals reresenting the values of a manipulated variable which when applied to the process to control the controlled variable would be expected, at least approximately, in view of the process characteristics, to cause the controlled variable to have the desired and actual value respectively, correctively changing the existing value of the manipulated variable according to the output signal derived from the desired value input signal, and intermittently correcting said output signal in accordance with any difference between the two output signals, so that the effect of such correction is detected before a subsequent correction.

2. A method of feedback control for processes subject to dead time and said method being according to claim 1, being further characterised by automatic variation of the duration of the interval between successive correction actions of the control in relationship to the dead time of the process.

3. A method as claimed in claim 2 characterised in that the processing speed is varied for control purposes and the duration of said interval is varied in inverse relationship to the speed.

4. A method as claimed in claim 2 characterised in that the processing time is varied for control purposes, and results in a like variation in the dead time, and the duration of said interval is varied in direct relationship to the processing time.

5. A method as claimed in claim 3 characterised in that it is applied to the control of a continuous drying process for travelling textile material.

6. Process control apparatus comprising a device having means to receive said signals and programmed so as to derive from said signals corresponding output signals representing the values of the manipulated variable which when applied to the process to control the controlled variable would be expected, at least approximately, in view of the processing characteristics, to cause the controlled variable to have the desired and actual value respectively and means to correctively change the existing value of the manipulated variable according to the output signal derived from the signal representing the desired value of the controlled variable, and means to intermittently correct said output signal in accordance with any difference between the two output signals, so that the effect of such correction is deteced before a subsequent correction.

7. Process control apparatus according to claim 6 and including means for causing automatic variation of the duration of the interval between successive corrective actions of the control in relationship to the dead time.

8. Process control apparatus according to claim 6 and including a machine to progress material through a processing zone, a rotary member adapted to be driven mechanically from those moving parts of the machine which serve to progress material through the processing zone thereof, a switch, which when actuated, is adapted to initiate a corrective action in the form of a change in processing speed and a cam associated with said rotary member in such manner as to operate said switch at intervals corresponding to the passage of a given length of material.

9. Process control apparatus according to claim 7 characterised by means to generate energy pulses at a rate proportional to the speed of passage of material through the processing zone of the machine, control means, which, when actuated, initiates a corrective action in the form of a change in processing speed, a counter having means to count said pulses, and, after counting a certain number, corresponding to the passage of a certain length of material, to generate a timing output pulse to actuate the control means, and to reset itself.

10. Process control apparatus as claimed in claim 7 characterised by a tachogenerator to generate a voltage proportional to the speed of passage of material through the processing zone of the machine, an integrating type circuit to which said voltage is fed, a relay circuit arranged to be operating and then give a pulse adapted to initiate a corrective action and to reset the system, at intervals corresponding to the passage of a given length of material.

11. Process control apparatus as claimed in claim 6 in which said device comprises duplicated models each receiving one generated signal and deriving from it the corresponding output signal.

12. Process control apparatus as claimed in claim 6 in which said device comprises a single model having changeover switching means to enable comparison to be made between the two output signals by means of a store which stores one while the switches are changed over to cause the other to be fed thereto.

13. Process control apparatus as claimed in claim 12 in which said store is an inverting and integrating amplifier whose output is an inverted replica of its input, which is reset to the output signal representing the value of the manipulated variable corresponding to the desired value of the controlled variable with the changeover switching in one position, and which gives rise to a differencing circuit signal equal to the difference in the two output signals with the changeover switching in the other position.

14. Process control apparatus as claimed in claim 6 in which said device comprises a single model having changeover switching to enable comparison to be made between the two output signals by means of a store in the form of an inverting and integrating amplifier whose output is an inverted replica of its input, which receives the output signal derived from the signal representing the desired value of the controlled variable with the changeover switching in one position, and which gives rise to a differencing circuit signal equal to the difference in the two output signals with the changeover switching in the other position; and in which means is provided to maintain the differencing circuit signal for addition to the signal held in the store to provide a combined signal according to which corrective changes in the existing value of the manipulated variable are made.

15. Process control apparatus as claimed in claim 6 further characterised in that said device is programmed for a linear relationship between the controlled and manipulated variables.

16. Process control apparatus as claimed in claim 6 further characterised in that said device is programmed for a non-linear relationship between the controlled and manipulated variables.

17. A machine for the continuous drying of travelling textile material in combination with the process control apparatus of claim 6.

18. Apparatus for controlling the speed of movement of material, comprising means, including an electrically operated variable speed device, to move said material, means sensing a characteristic of said material, to generate an electric signal corresponding to the sensed characteristic, electric process control means, means to feed said generated electric signal to said electric process control means, means to feed a predetermined signal to said electric process control means, means controlled by said electric process control means to control the speed of said device to make a correction in its speed, and means to send pulses to said electric process control means at intervals which allow movement of a length of said material, not less than the length of movement of said material after a correction has been made to the speed of drive of said material, necessary to be detected by said sensing means.

19. The combination of claim 18, including a circuit in said means to feed the generated signal to said electric process control means and interposed between said sensing means and said electric process control means, to measure said electric signal generated by said sensing means, said circuit including a filter means having a time constant, the interval between successive actuation of said circuit being such as to allow sufficient time to take into account the timing constant of the filter circuit.

20. The combination of claim 19, and an electric speed controller interposed in said means controlled by said electric process control means to control the speed of said device and disposed between said electric process control means and said device.

21. The combination of claim 20, and means dependent on the speed of said device, to control said pulsing means.

22. The combination of claim 21, and means dependent on the speed of said device to control said speed controller.

23. The combination of claim 22, said means to control said pulsing means and said means to control said speed controller, comprising a tachogenerator.

24. The combination of claim 21 including a moisture applying enclosure means through which a portion of said moving material passes, said sensing means being located at the exit end of said enclosure means.

25. The combination of claim 21, and means to count said pulses produced by said pulsing means, means to produce a timing output pulse each time a predetermined number of said pulses are counted and to feed said output pulse to said electric process control means.

References Cited

UNITED STATES PATENTS

| | | | |
|---|---|---|---|
| 2,467,856 | 4/1949 | Rich | 236—15 |
| 3,076,926 | 2/1963 | Barry et al. | 236—15 |
| 3,088,224 | 5/1963 | Cohn et al. | 34—23 |
| 3,259,994 | 7/1966 | Klinkmueller et al. | 34—26 |
| 3,304,621 | 2/1967 | Nelson | 34—53 |

LLOYD L. KING, Primary Examiner

U.S. Cl. X.R.

34—26, 30